C. A. PARSONS.
JOURNAL BEARING.
APPLICATION FILED JUNE 2, 1913.

1,161,721.

Patented Nov. 23, 1915.

Fig.Z.

WITNESSES
H. L. Alden
R. L. Ourand

INVENTOR
Charles A. Parsons
BY Spear, Middleton, Donaldson & Spear
ATTORNEY

UNITED STATES PATENT OFFICE.

CHARLES ALGERNON PARSONS, OF NEWCASTLE-UPON-TYNE, ENGLAND.

JOURNAL-BEARING.

1,161,721.        Specification of Letters Patent.        Patented Nov. 23, 1915.

Application filed June 2, 1913. Serial No. 771,361.

*To all whom it may concern:*

Be it known that I, CHARLES ALGERNON PARSONS, a subject of the King of Great Britain and Ireland, and residing at Heaton Works, Newcastle-upon-Tyne, in the county of Northumberland, England, have invented certain new and useful Improvements in Journal-Bearings, of which the following is a specification.

This invention relates to improvements in journal bearings and particularly to those of the type provided with a plurality of bearing blocks which are pivotally supported. In such bearings as have hitherto been proposed, the pivoting is effected by means of pins passing through suitable projections on a stationary member surrounding the blocks. Consequently, as the total pressure on the bearing is taken by these pins the maximum pressure allowable is unnecessarily limited.

The object of the present invention is to overcome this disadvantage and to provide an improved bearing which, besides being of reduced length, is capable of working with small frictional losses, and of being easily manufactured.

The invention consists in a journal bearing having bearing blocks which are pivotally supported by contact with the inner surface of a member surrounding the blocks.

The invention also consists in the improved journal bearings hereinafter indicated.

Figure 1:
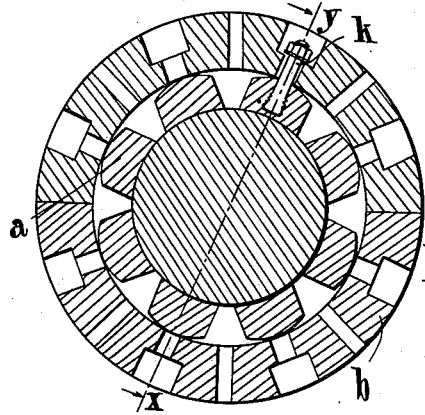
Figure 2:
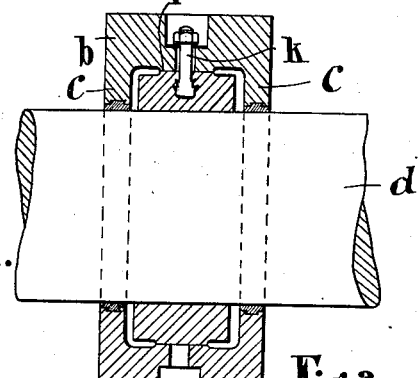
Figure 3:
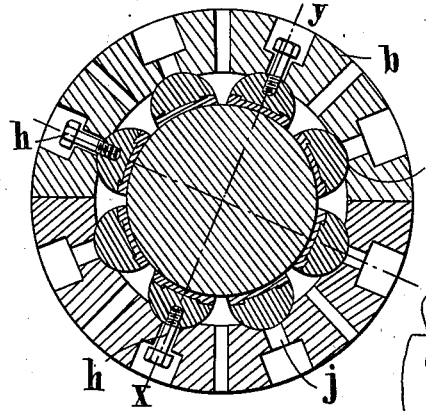
Figure 4:
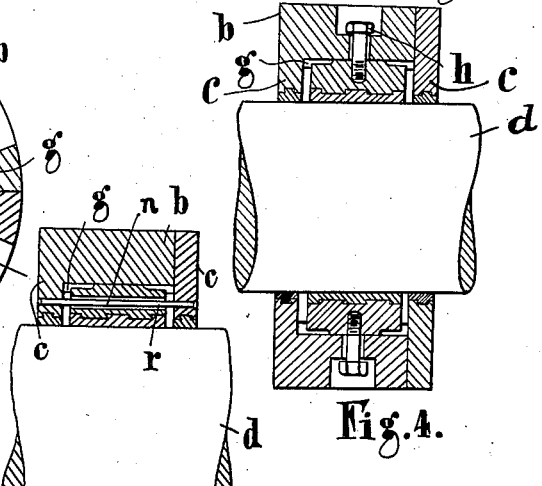
Figure 5:
Figure 5:
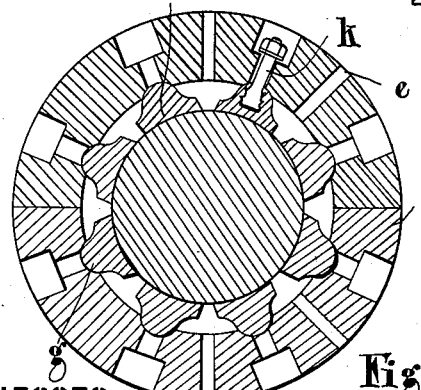
Figure 6:
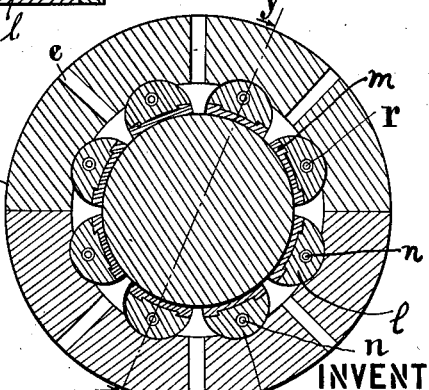

Figure 1 is a cross section through a journal embodying the present invention. Fig. 2 is a longitudinal section on the line $x\ y$ of Fig. 1, viewed in the direction of the arrows. Fig. 3 is a cross sectional view through a modified construction of journal bearing according to the present invention. Fig. 4 is a longitudinal section on the line $x\ y$ of Fig. 3, viewed in the direction of the arrows. Fig. 5 is a cross section through a further modification. Fig. 6 is a cross section through a further modification of the present invention. Fig. 7 is a longitudinal section on the line $x\ y$ of Fig. 6, viewed in the direction of the arrows.

In carrying the invention into effect, according to one form as shown in Figs. 1 and 2, the bearing blocks $a$ are preferably arranged within a supporting ring $b$ placed in the outer casting of the journal. This ring $b$ is usually made in two parts and preferably provided with inwardly projecting flanges $c$ one of which may be detachable as shown in Figs. 4 and 7, which contact with the shaft $d$ to be supported, and are therefore capable of retaining lubricant within the ring into which it is introduced at a suitable number of points for instance by way of openings $e$. The number of pressure blocks employed is such that the lubricant in the supporting ring shall be supplied to the surface of the shaft at short intervals around its circumference, for example, eight such blocks provided with suitable bearing surfaces will be found to give the desired effect.

The employment of a large number of blocks is advantageous in reducing the length of the bearing, owing to the load being carried on several lines of contact *e. g.* on all the blocks of the lower half instead of on one line of contact as in the usual type of cylindrical bearing.

In pivotally supporting the blocks according to the present invention any of a variety of ways may be employed so long as each block is retained with its axis approximately parallel to the supported shaft, and has preferably a small amount of play as regards its axis in order to allow for the alinement of the shaft, as in the well-known ball-and-socket bearings, but with this difference, that each bearing block separately alines itself to the shaft. For this purpose the pivotal support may be of a cylindrical, spherical or ball-and-socket character. Thus, for example, according to one construction as shown in Figs. 1 and 2 the pivoting surface of each block $a$ is cylindrical, and has a radius smaller than the internal radius of the outer supporting ring, $b$, while its axis is situated substantially parallel to that of the supported shaft $d$. Usually the length of this cylindrical pivoting surface $f$ is about half the length of the bearing block, as this has been found in practice to render the blocks self-alining to a certain extent. If desired, however, a corresponding cylindrical recess $g$ (see Figs. 3 and 7) in the outer supporting ring $b$ may form a seating for the block, $a$. In this way a large surface of contact is provided between the bearing block and the supporting ring, the necessary angular movement of the block being thus obtained by a sliding contact between the surfaces instead of by rocking, as in the case illustrated in Figs. 1 and 2 in which the outer ring $b$ is not recessed. In this construction the blocks may be formed by cast iron bodies *l* incased with a layer of white metal *m*.

The movement of the blocks is preferably limited by means of suitable stops which, for example, may take the form of bolts *h* which are screwed into each block and pass through holes *j* in the supporting ring, this hole having sufficient clearance to permit the necessary angular movement of the block. During manufacture of the bearing such bolts *h* may also be found serviceable, for by the employment of a few temporary nuts and washers the blocks can be rigidly held in position in the supporting ring, so that when the ring is mounted in a lathe the block surfaces which are to be in contact with the shaft can accurately be machined to the desired diameter. In the same way, such bolts may be used to secure the blocks when the bearing is being dismantled. Instead, however, of screwing the bolts into the blocks, each block (see Figs. 1, 2 and 5), may be cast around one end of a jagged bolt *k*, solid white metal being used for this purpose if desired. Otherwise, as shown at Fig. 3 a cast iron bearing block *l* may be cast around each bolt *k* and incased with a layer of white metal *m*, thus enabling advantage to be taken of the modern methods of die-casting, and the bearing blocks thus to be cast ready for use without requiring any machining. The movement of the blocks may in some cases be limited by providing for each block a suitable pin *n* (see Figs. 6 and 7), which prevents the rotation of the block but allows it to cant slightly to accommodate want of alinement of the shaft and also to find its position to preserve the oil film between itself and the shaft. This pin *n* is so arranged that the pressure on the block is transmitted directly to the supporting ring *b* and not through said pin. When the pivoting support of the blocks is spherical the contact surface of the supporting ring is preferably recessed correspondingly in order to take advantage of the large bearing surface thus provided. The blocks in this modification may be mounted about pins passing through them as in the modification shown in Figs. 6 and 7. In many cases, however, where the spherical supporting pivot is employed, the provision of inwardly projecting flanges on the supporting ring may be found sufficient to prevent any undesirable movement of the blocks.

It has been found that with properly lubricated journal bearings having bearing blocks pivotally supported in accordance with the present invention pressures of from 500 to 3,000 lbs. per square inch or even more can be successfully sustained in high speed bearings without excessive wear, and that consequently a great reduction is effected in the length of the bearing which is now only about one-third the length of the bearings hitherto employed. The cost of manufacture is thus considerably reduced while the resulting economy in space is of great importance, especially in turbine driven installations.

Having now described my invention, what I claim as new and desire to secure by Letters Patent is:—

1. A journal bearing, comprising supporting means surrounding the journal, and a plurality of elements having their faces contacting with said journal, and their backs symmetrically pivoted directly on said supporting means.

2. A journal bearing comprising a supporting ring adapted to surround the journal, a plurality of pressure blocks positioned between said journal and the inner surface of said supporting ring, said blocks being provided with symmetrically positioned rounded portions of less radius than the inner radius of said ring acting to pivot and directly support said blocks upon the inner surface of said supporting ring.

In testimony whereof I affix my signature in presence of two witnesses.

CHARLES ALGERNON PARSONS.

Witnesses:
 FREDERICK GORDON HAY BEDFORD,
 ALBERT WILLIAM PARR.